Patented Aug. 13, 1935

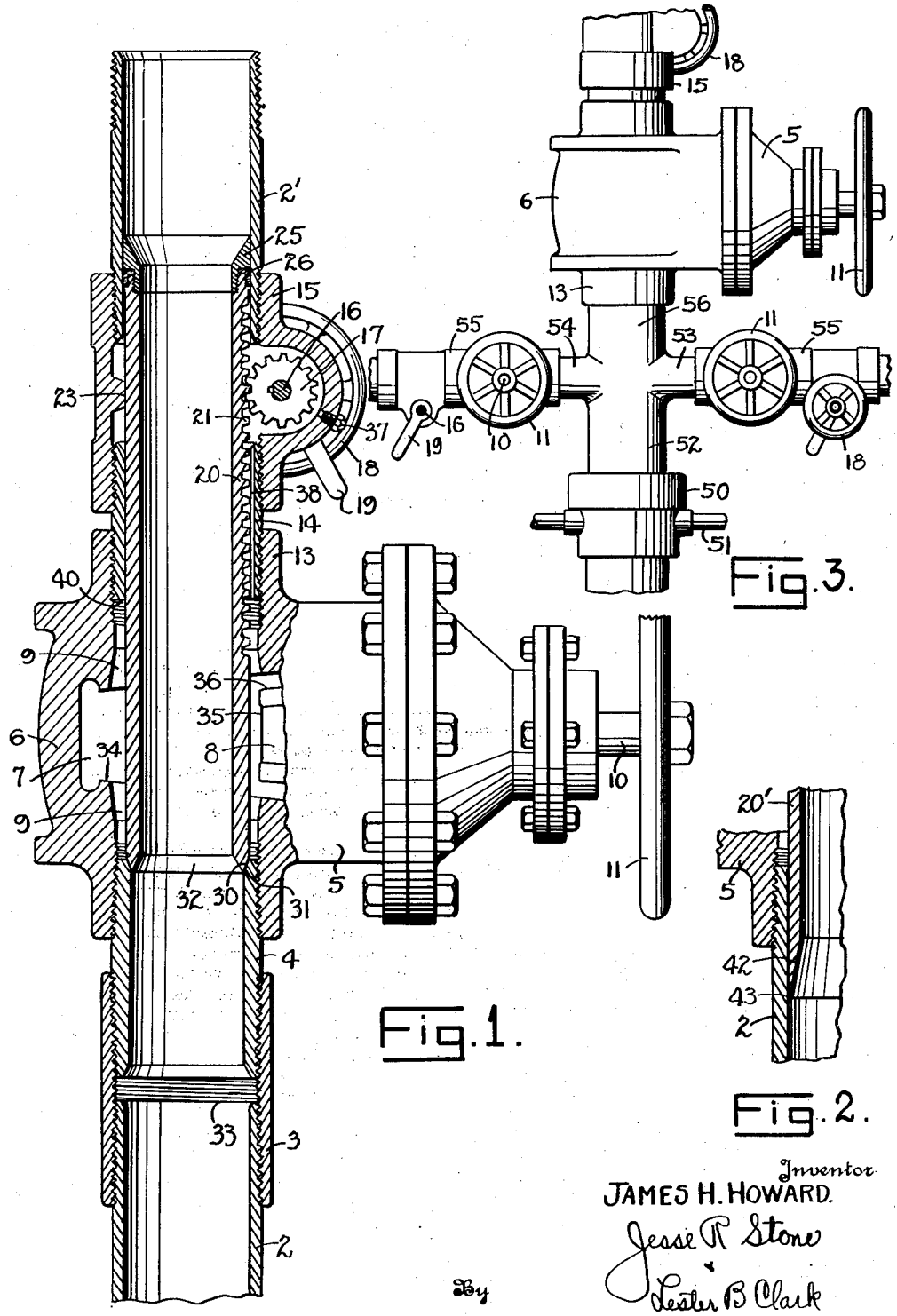

2,010,992

UNITED STATES PATENT OFFICE 2,010,992

VALVE PROTECTING DEVICE

James H. Howard, Houston, Tex., assignor to J. H. McEvoy & Company, Houston, Tex.

Application December 26, 1930, Serial No. 504,722

3 Claims. (Cl. 137—111)

The invention relates to an improvement in a device for protecting valves.

In the development of oil well and oil field equipment and pipe lines the use of valves and, particularly gate valves, has been enormously increased. The gate valve is used to completely cut off the flow of fluid through the pipe line in which the valve is inserted. If the fluid passing through the pipe line contains abrasives such as sand, grit or other materials, or if corrosive ingredients are contained therein, there will be deposits of these materials in the housing of the gate valve, in the different parts of the gate chamber, about the gate member, and also excessive wear may occur. These deposits occur while the valve is in open position and in the event the valve is to be closed quickly when there is a break in the line, or for any other reason, it has been found that the gate chamber and seat in many instances are entirely covered with deposits of abrasive material or sediment so that the gate can not be closed. It is also a fact that in and about oil wells on the flow lines and casing that where the flow of fluid has been under considerable pressure that the gate member and the seat therefor have been found, in many instances, to have been cut away by the passage of the fluid, which contain the abrasive particles and when an emergency arises for closing the valve it can not be closed or, if moved to closed position, the parts have been so worn away that its operation is inefficient. If high pressure is encountered, unless the valve is completely closed, a small leak will almost instantly create a passage through which the abrasive will cut an enlarged opening, thus complete closing of the valve is necessary to insure its satisfactory operation.

In order to insure one valve which will operate satisfactorily on a casing head, as many as four valves are placed one above the other on the casing and in the flow lines in the hope that one of the valves will be in an operative condition in the event of emergency. The expense of providing four valves when only one is to be used adds an enormous burden to the cost of production and it is with the object in mind of providing a single gate valve and so protecting this valve that it will be in proper condition for operation in the event of emergency or at any other time that the present device has been conceived.

It is one of the objects of the invention to provide a device which will restrict the flow of fluid through the gate valve to an area other than the gate chamber.

Another object of the invention is to provide a sleeve or tube to be inserted and retracted from the gate chamber of a valve so that the flow of fluid will be restricted to the sleeve when it is inserted in the valve housing.

Another object of the invention is to provide a retractable member for insertion in the gate valve housing so that a substantially uniform area for fluid flow will be provided.

A still further object of the invention is to provide a means for insertion in a valve housing so that the normal flow of fluid when the valve is open will be deflected from the gate member and the seat in the housing.

A still further object of the invention is to provide a sleeve for insertion in a gate valve housing longitudinally through the fluid passage to check the flow of fluid and in this manner protect the gate chamber and gate member.

It is also an object of the invention to provide an assembly for casing heads which will protect the valve members and allow positive closing of any of the flow lines or casings used about the well head.

It is also an object of this invention to provide a device or sleeve through which the fluid may pass and means to allow packing the gate chamber with corrosive resistant grease, so that the valve will also be protected against corrosion as well as erosion.

Various other objects of the invention will be readily understood by those schooled in the art when the following description is considered in connection with the accompanying drawing where:

Fig. 1 is a central vertical section of a pipe line equipped with my improvement.

Fig. 2 is a broken detailed section of a modified form of a seat for the protective device.

Fig. 3 is a side elevation of a well head assembly to which the invention has been applied.

The invention will be best understood by having reference to Fig. 1 wherein a pipe is illustrated at 2 which pipe may be one portion of a pipe line and may be the upper end of a well casing or string of piping used for flowing the fluid from the well or it may be any other type of pipe through which fluid is adapted to flow. A coupling is indicated at 3 as being connected to the pipe 2 and this, in turn, receives the nipple 4. To this nipple 4 is connected a well known type of gate valve indicated generally at 5. It is to be understood, however, that this valve 5 may be connected to the nipple 4 as indicated or it may be connected directly to the pipe 2, and that the coupling 3 and the nipple 4 have been included for purposes of illustration.

The gate valve 5 includes the housing 6. The gate chamber 7 and the gate valve member 8. This valve member is of the usual tapered or wedge shaped formation and is arranged to be moved transversely across the fluid passage 9 by means of the rotation of the shaft 10 by the hand wheel 11. This valve 5 is of a common type but obviously the precise type of valve to which the invention is to be applied is entirely independent of the present disclosure as it is intended that the invention may be applied to any type of valve which has a straight fluid passage therethrough.

In the form shown in Fig. 1 the upper end 13 of the gate valve 5 receives a nipple 14 to which is connected the body portion 15 of the protective device. Within said body portion is mounted a transverse shaft 16 upon which is fixed a pinion 17 and a hand wheel 18. A seal may be provided about the shaft 16 where it passes into the body 15 and in order to retain the pinion 17 in position a lever 19 has been provided on shaft 16 which locks shaft 16 in position when the lever is turned or screwed into abutment with stuffing box or seal on the shaft 16.

Inside the body 5 is mounted a sleeve 20 which may be in the form of a section of pipe. This sleeve 20 is of such size that it will slide within the nipple or seal member 14 and is of such length that it extends into the housing 6 of the gate valve as illustrated. This sleeve 20 is provided with rack teeth 21 which may be formed integrally therewith by a milling operation or which may be a rack welded or otherwise attached to the side of the pipe. These teeth 21 are adapted to co-operate with the teeth on the pinion 17 so that rotation of the hand wheel 18 will cause raising or lowering of the sleeve 20. In order to absorb the thrust of the interengaging teeth of the pinion and the rack, a rib 23 has been illustrated as formed on the body 5. It is to be understood that any desired number of teeth may be provided in the rack 21 so that the sleeve may be entirely withdrawn from the valve chamber 7 and the passages 9 through the housing 6. The upper end of the sleeve 20 is provided with a ring 25 which is threaded to the sleeve and arranged to retain the packing ring 26 in proper position. This packing ring may be of any desired type but has been shown as of the cup form with the lips extending downwardly in the direction from which the pressure is expected so that the pressure will tend to expand the packing and form a seal with the pipe or nipple 2' which is in the nature of a continuation of the pipe 2 or it may be of any desired nipple or coupling through which the fluid is to pass after leaving the pipe 2.

The lower end of the sleeve 20 may be tapered at 30 on its outer face in order that it will seat with the inclined portion 31 on the nipple 4. The inner face 32 is tapered at a slight incline in order that the flow of fluid will be deflected into sleeve 20 and undue turbulence will be avoided. It is intended that this taper 32 will be provided with a hard facing so that abrasion will be resisted. The nipple 4 has been shown as being the inclined seat or bevel 31 in order to receive the sleeve 20. However, such structure is not essential to the practicing of the invention as it is intended that the sleeve 20 may seat upon the upper end of the pipe 2 if the coupling 3 and the nipple 4 are dispensed with. In many oil wells in casing head installations the gate 5 is attached directly to the upper end of the pipe or casing 2 and in this event the sleeve 20 would seat upon the upper edge 33 of the pipe 2. This edge 33 would be ordinarily rounded slightly as in the general run of casing but it is intended that the sleeve 20 would seat on this portion 33 and maintain a sufficient seal to cause satisfactory operation of the device.

When the structure is in the position shown in Fig. 1 the chamber 7 would be closed off from the inside of the sleeve 20 so that there could be no accumulation of sediment or material in the chamber 7 or about the gate member 8. If the sleeve were not in operation the flow of fluid through the pipe 2 entering the chamber 7 would be turbulated considerably and any abrasive material being carried by the flow would tend to cause erosion of the seat 34 and the end 35 and the seal 36 on the gate member.

In addition to this, quantities of material would be deposited in the chamber 7 so that in the event that the gate were to be operated quickly its satisfactory manipulation would be impossible. However, with the sleeve 20 in the position shown the flow of the fluid is entirely cut off from the chamber 7 and the parts thus cut off from the flow of fluid will not be subject to erosion, or corrosion and will be maintained in proper condition to completely seal the valve and the passage therethrough when the sleeve 20 is retracted by manipulation of the handle 18.

The seat between the end of the sleeve 20 and the nipple 4 or casing 2 does not necessarily have to be fluid tight for the reason that the sleeve 20 fits snugly into the bushing or guide member 14 and most of the pressure would be resisted at this point. With this arrangement pressure would exist in the chamber 7 but there would be no substantial flow of fluid past the lower outer surface of the sleeve 20. The packing 26 also assists the nipple 14 in maintaining a seal, so that grit or sand will not cause jamming, also that lubricating grease will not be blown from around the gear 17 or valve gate 8.

In order that the parts may be properly lubricated and corrosion resisted to a considerable degree a lubrication valve 37 has been provided on the body 15. This valve may be located at any other desired position but has been shown here in order that lubricating material may be injected into the body 15 about the pinion 17 and the sleeve 20. A small passage 38 has been provided in the bushing 14 in order to allow lubricant to pass into the valve chamber 7. With this construction lubricant under pressure may be injected through the valve 37 until the chamber 7 is entirely filled with lubricant. In this manner the gate member 8 and the seats 34 would be enclosed with a quantity of lubricant so that corrosion from gas and acids would be immediately cut off.

It is to be understood that the device may be applied to wells, pipe lines, refineries or waterworks, wherein valves such as the gate valve 5 or similar structures are already in place, regardless of whether such valves are connected directly to a pipe 2 or connected to a nipple such as 4. In either event the bushing 14 is merely screwed into the end 13 of the valve and with it the body 15, the hand wheel 18 and the sleeve 20. This may be accomplished in simple manner by merely closing the gate member 8 and attaching the bushing 14 when the sleeve 20 is in raised or retracted position. After it has been connected the other fittings fastened on the pipe 2 or the gate valve may be opened and the handle 18 manipulated to lower the sleeve 20 so that it will seat on the pipe or other member on the opposite side of the valve. When the sleeve 20 is closed in position the flow of fluid will be directly therethrough and no further erosion or corrosion of the inner structure of the gate valve will occur.

The bushing 14 may be of any desired construction but has been illustrated as being a square shoulder at 40 on its lower end so that any scale or other deposit accumulated on the outside of the sleeve 20 while it is in the protective position will be scraped or removed when the tube is retracted so that the seal provided by the bushing 14 will not be materially impaired.

While the connecting members have been shown as provided with threaded portions it is intended that the invention may be embodied in structures having flanged or other connecting portions.

Fig. 2 shows a modified form of the lower end of the sleeve 20 which sleeve has been indicated as 20'. This sleeve is similar to the sleeve 20 except that the lower outer surface is made cylindrical and of substantially the same diameter as the remainder of the tube so that it will telescope inside of the casing 2 or other pipe upon which the gate 5 is mounted in order to avoid as much as possible any emulsification of the oil and water passing through the pipe and to avoid turbulence as much as possible. The lower end of this sleeve 20' is shown as formed with a very slight taper 42 and the lower edge is more or less sharpened at 43 so that a scale or other material will be removed as the sleeve is moved into telescoping position. Obviously the amount of telescoping may vary with the width of the particular valve or the amount which the pipe is screwed into the gate valve flanges but variations in the amount of telescoping will not affect materially the operation of the device.

Fig. 3 shows a casing head or well assembly of a type very often employed in oil wells. The casing head is indicated generally at 50 and is provided with bleeder or flow lines 51. Extending above the casing is a cross member 52 having the flow lines 53 and 54 extending laterally therefrom. Attached to each of these flow lines is shown a device which embodies an ordinary type of gate valve as well as the present invention. In Fig. 1 the invention is shown as having been attached to the gate member by means of the bushing 14 but in Fig. 3 the gate valve and the body 15 of the protective device have been combined in a unitary casting indicated at 55. It seems obvious that such an adaptation may be practiced without departing from the spirit of the invention as with a device of this type it is only necessary to install one piece of apparatus in order to have complete protection of the valve and to form a substantially continuous pipe past the inside of the gate valve.

The internal construction of the device as indicated at 55 is the same as that shown in Fig. 1 and for this reason an internal sectional view has not been illustrated. On the vertically extending outlet 56 of the cross 52 a gate valve and protective device of Fig. 1 have been illustrated in side elevation.

It is to be understood that this protective device may be applied wherever valves are used in which a passage through the valve housing is of such a character that the sleeve may be readily inserted and may particularly be applied directly to the tubing in connection with oil wells so that a gate valve may be applied directly to the tubing and by retracting the sleeve 20 the tubing may be closed. If devices are also placed on the flow lines as shown in Fig. 3 a complete closure of the well might be had by closing the tubing with one device and closing the flow lines with the other structures placed thereon so that the well could be completely controlled without removing the tubing or other parts of the apparatus.

It is intended that various modes of operation of the sleeve 20 may be practiced other than the rack and pinion combination here illustrated and if desired, it is intended that any suitable mechanism may be employed.

Having described the invention what I claim is:—

1. In a well control head a gate valve, a fixed pipe connected to each end of said valve, a sleeve disposed in said valve, a seat for one end of said sleeve on one of said pipes, a seal on the other end of said sleeve to engage the other of said pipes whereby said sleeve serves as a continuation of said pipes, and means to raise said sleeve so that said valve may close.

2. In a well control head a gate valve, a pipe fixed to each end of said valve, a movable sleeve telescopically mounted in one of said pipes, means to move said sleeve across said valve to seat on the other pipe so that said sleeve forms a continuation of said pipes to conduct fluid through said valve.

3. In a well control head a gate valve, a pipe fixed to each end of said valve, a movable sleeve telescopically mounted in one of said pipes, means to move said sleeve across said valve to seat on the other pipe so that said sleeve forms a continuation of said pipes to conduct fluid through said valve when closed and permitting closing of said valve when open.

JAMES H. HOWARD.